(12) United States Patent
Bauer et al.

(10) Patent No.: US 9,325,135 B2
(45) Date of Patent: Apr. 26, 2016

(54) DEVICE FOR CONNECTING AN ELECTRICAL CONNECTOR TO AN ELECTRICAL CONTACT PART

(75) Inventors: Hans Bauer, Rednitzhembach (DE); Georg Seitz, Kasing (DE); Hans-Peter Fink, Eichstätt (DE); Markus Schäfer, Bad Schönborn (DE); Werner Haag, Waghäusel (DE)

(73) Assignees: AUDI AG, Ingolstadt (DE); SCHÄFER WERKZEUG- UND SONDERMASCHINENBAU GMBH, Bad Schönborn-Langenbrücken (DE)

( * ) Notice: Subject to any disclaimer, the term of this patent is extended or adjusted under 35 U.S.C. 154(b) by 245 days.

(21) Appl. No.: 13/818,944

(22) PCT Filed: Aug. 25, 2011

(86) PCT No.: PCT/EP2011/004264
§ 371 (c)(1),
(2), (4) Date: May 13, 2013

(87) PCT Pub. No.: WO2012/025235
PCT Pub. Date: Mar. 1, 2012

(65) Prior Publication Data
US 2014/0144016 A1  May 29, 2014

(30) Foreign Application Priority Data
Aug. 26, 2010 (DE) .......................... 10 2010 035 424

(51) Int. Cl.
*B23P 19/00* (2006.01)
*H01R 43/20* (2006.01)
(Continued)

(52) U.S. Cl.
CPC ............. *H01R 43/04* (2013.01); *B23K 26/20* (2013.01); *B23K 26/22* (2013.01); *H01R 4/184* (2013.01);
(Continued)

(58) Field of Classification Search
CPC .................. Y10T 29/53209; Y10T 29/53213; Y10T 29/53226; Y10T 29/53235; Y10T 29/49179; Y10T 29/49185; H01R 43/20; H01R 43/02; H01R 43/048
USPC .................... 29/747, 748, 751, 753, 860, 863
See application file for complete search history.

(56) References Cited

U.S. PATENT DOCUMENTS 4,913,678 A * 4/1990 Avellino et al. ............... 439/879
4,966,565 A * 10/1990 Dohi .............................. 439/874
(Continued)

FOREIGN PATENT DOCUMENTS

DE   30 17 364    11/1981
DE   42 00 492    4/1993
(Continued)

OTHER PUBLICATIONS
International Search Report issued by the European Patent Office in International Application PCT/EP2011/004264.

*Primary Examiner* — Paul D Kim
(74) *Attorney, Agent, or Firm* — Henry M. Feiereisen LLC

(57) ABSTRACT

In a method for connecting an electrical conductor to an electrical contact part, wherein the contact part has deformable legs the legs are deformed by means of a bending die in such a way that the legs press the conductor with the contact part in a force-locked manner, wherein the contact part is acted upon in so that at least the legs are materially connected to each other. A device includes a bending die for connecting an electrical conductor to an electrical contact part, wherein the contact part has deformable legs and the bending die is designed to deform the legs in such a way that the legs press the conductor with the contact part in a force-locked manner, and wherein the device also includes a laser welding device designed to act on the contact part so that at least the legs are materially connected to each other.

3 Claims, 3 Drawing Sheets

(51) Int. Cl.
*H01R 43/04* (2006.01)
*B23K 26/20* (2014.01)
*B23K 26/22* (2006.01)
*H01R 4/18* (2006.01)
*H01R 43/02* (2006.01)
*H01R 43/048* (2006.01)
*H01R 43/058* (2006.01)

(52) U.S. Cl.
CPC ............ *H01R 4/187* (2013.01); *H01R 43/0221* (2013.01); *H01R 43/048* (2013.01); *B23K 2201/38* (2013.01); *H01R 43/058* (2013.01); *Y10T 29/49185* (2015.01)

(56) References Cited

U.S. PATENT DOCUMENTS

| | | | |
|---|---|---|---|
| 5,269,056 A * | 12/1993 | Yang et al. | 29/879 |
| 5,300,755 A * | 4/1994 | Nishitani et al. | 219/121.63 |
| 5,451,736 A * | 9/1995 | Fiedler et al. | 219/56.22 |
| 5,961,348 A * | 10/1999 | Murphy | 439/579 |
| 6,531,676 B2 * | 3/2003 | Schwemmer et al. | 219/121.64 |
| 6,697,675 B1 * | 2/2004 | Safarevich et al. | 607/116 |
| 6,813,826 B2 * | 11/2004 | Ito et al. | 29/753 |
| 7,008,273 B2 * | 3/2006 | Zhou | 439/874 |
| 7,033,233 B2 * | 4/2006 | Fujimoto et al. | 439/874 |
| 7,705,265 B2 * | 4/2010 | Asakura et al. | 219/121.64 |
| 2010/0105256 A1 * | 4/2010 | Lyford et al. | 439/877 |

FOREIGN PATENT DOCUMENTS

| | | |
|---|---|---|
| DE | 198 40 214 | 3/1999 |
| DE | 100 07 258 | 8/2001 |
| DE | 103 58 153 | 8/2004 |
| DE | 103 52 482 | 6/2005 |
| DE | 102004053126 | 5/2006 |
| DE | 102007032584 | 11/2008 |
| JP | H 04-137380 | 5/1992 |
| JP | 2000-231944 | 8/2000 |

\* cited by examiner

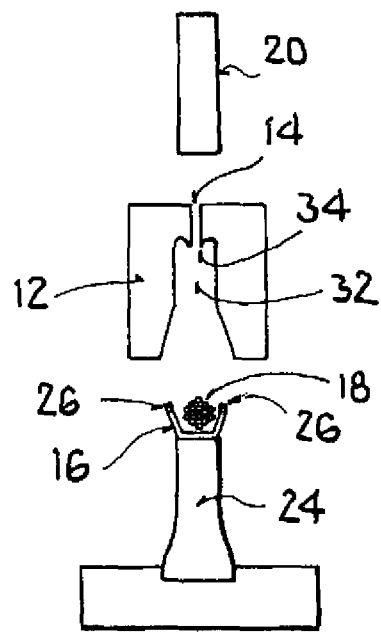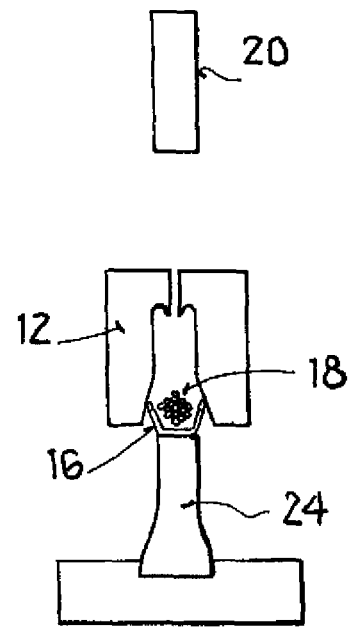
(1) FIG.1A      (2) FIG.1B
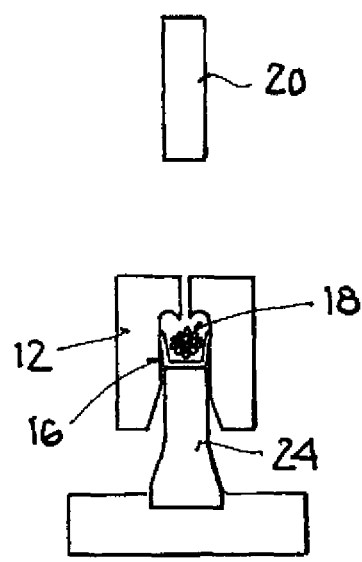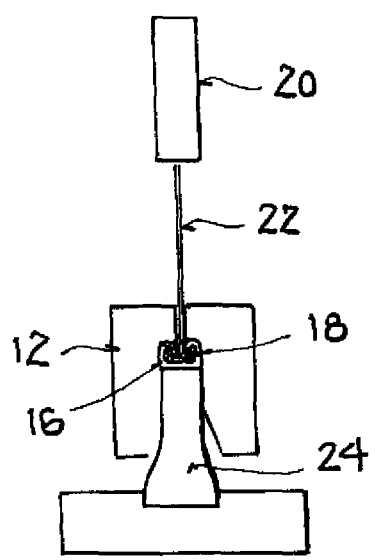
(3) FIG.1C      (4) FIG.1D

DEVICE FOR CONNECTING AN ELECTRICAL CONNECTOR TO AN ELECTRICAL CONTACT PART

CROSS-REFERENCES TO RELATED APPLICATIONS

This application is the U.S. National Stage of International Application No. PCT/EP2011/004264, filed Aug. 25, 2011, which designated the United States and has been published as International Publication No. WO 2012/02535 A1 and which claims the priority of German Patent Application, Ser. No. 10 2010 035 424.4, filed Aug. 26, 2010 pursuant to 35 U.S.C. 119(a)-(d).

BACKGROUND OF THE INVENTION.

The invention relates to a method for connecting an electrical conductor with an electrical contact part, wherein the contact part has deformable legs and the legs are deformed by means of a bending die so that they force fittingly press the conductor together with the contact part. Further, the invention relates to a device with a bending die for connecting an electrical conductor with an electrical contact part, wherein the contact part has deformable legs and the bending die is configured to deform the legs so that they press the conductor force fittingly together with the contact part.

For electronic and electrical components of a motor vehicle for example the vehicle's electrical system, the connection of contact parts and lines usually occurs via a mechanical, force fitting connection, the so called crimp connection. In the crimp method at least two components are force fittingly interconnected by plastic deformation of at least one component. Usually, a contact part has so called legs or crimp flanks, which are forcibly pressed together with the strands of a cable by squeezing. This does normally not achieve a material connection. According to the sate of the art it is common to achieve a honey comp like pressing of the strands in the contact part by a pressing degree of about 20%. In addition, a support of the legs should be achieved to counteract a possible springing back.

The quality control of such crimp connections usually is usually performed by the so called crimp force monitoring, in which the force which has to be applied for the crimping or bending is measured in dependence on the bending path. The force integrated over the path results in the performed work, wherein in the crimp force monitoring the difference in work between a crimped contact part without line and a crimped contact part with line is used as a measure for the quality of the crimp connection. A difference in work of about 30% allows diagnosing missing strands of a cable, an insufficient pressing of contact part and line, and changed crimp parameters (for example crimp height).

The crimp methods known from the sate of the art have two significant disadvantages:

At very small line cross sections (smaller than 0.35 sq. mm) or great sheet thickness of the contact part in the deformed region, the measured work difference is so small that a sufficient monitoring of the crimp method is no longer possible. For example, missing strands of a cable can then no longer be identified. However, when individual strands of the cable are missing in the crimped region, the pressing degree in the crimp decreases and the electrical contact resistance between the conductor and the contact part can increase to become infinite. As a result, an electrical functionality of the connection is no longer given.

A typical material for the deformable contact part is metal. Because every metal has elastic properties, an insufficient support of the deformed crimp legs can result in an undesired springing back of these legs. This can lead to a deterioration of the contact between the deformed contact part and the conductor and the electrical resistance between the two components increases. The quality of the crimp connection is decreased.

From DE 103 58 153 A1 a connection method is known in which a cable is first crimped together with a contact element and then laser welded with the latter in three individual steps. The crimping and the laser welding are performed in two separate devices and thus also in separate work steps.

DE 10 2004 053 126 A1 discloses a device in which an electrical conductor is crimped together with a contact element and welded in the same work step. The crimp flaps of the contact element are pressed with a special crimp tool. The crimp contact is generated between the sheath of the electrical conductor and the crimp flaps of the contact element, whereas the welding is performed at a different site between a conductor end and the contact element. During welding, an electrical current flows via welding electrodes through the elements of the conductor to be connected and the contact element.

From DE 198 40 214 C2 a method is known for pressure welding by means of which lines between the flaps of a line-holding part is fixed. For this, the lines are first placed into the line-holding part and its one flap is pressed overlappingly under the other flap by using an anvil and a crimp die. Subsequently, the flaps are welded together.

DE 100 07 258 A1 discloses a mobile cable connector in which a wire bundle is inserted into a slanted cylindrical metal sleeve. At the slanted insertion opening, the wire bundle is then ultrasound-welded with a side of the sleeve via two electrodes.

DE 103 52 482 A1 describes a device with which the strands of different cables can be welded together. In addition, it enables crimping of the electrically insulated regions of the cables.

From DE 30 17 364 A1 a method is known in which the strands of a cable are first crimped with a flat plug in that a die stamp presses the metal legs of the flat plug together. The die stamp also serves for ultrasound-welding strands and flat plugs to one another.

Also from DE 10 2007 032 584 B4 a device is known for producing crimp and welding connections. Here, the crimp of a contact element is first closed about the insulation of a cable, and in a second step the insulated cable end welded together with the contact.

SUMMARY OF THE INVENTION

It is an object of the present invention to produce a secure connection between an electrical conductor and an electrical contact part.

This object is solved by a method which includes deforming deformable legs of the electrical contact part by means of a bending die so that the legs force fittingly press the electrical conductor together with the contact part, and influencing the contact part via at least one opening in the bending die so that at least the legs are materially connected to one another, and by a device which includes a bending die for connection and electrical conductor with an electrical contact part, wherein the bending die has a bending side and an opening, wherein the bending side delimits a space; and a laser welding device configured to act upon the contact part so that at least the legs are force fittingly connected to one another, wherein the bending die is configured for deforming deformable legs of the contact part so that the legs force fittingly press the conductor together with the contact part, and wherein a welding laser beam emitted by the laser welding device is directable through the opening into the space.

The method according to the invention uses a bending die. The bending die is configured so that deformable legs of a contact part can be deformed therewith so that they form fittingly press a conductor together with the contact part. Such a bending die is also referred to as crimper. The bending die is in particular configured so that it deforms the legs of the contact part in a predetermined and controllable manner. The method is in particular applicable to contact parts which are made of metal and which have bendable lateral flank regions in the shape of metal lobes or legs. The legs of a contact part can be arranged pair wise opposing one another. When a conductor is located between the legs for example in the form of strands of a cable, the conductor can be pressed between the strands by deforming the legs.

The bending die is in particular configured so that this squeezing or pressing can be performed particularly effectively. It will in particular have a recess for the contact part and the conductor, wherein a force which acts between the contact part and the bending die causes the contact part to be deformed by the mechanical resistance of a wall region of the bending die, which wall region delimits the recess. At least one side or surface of the bending die which is in mechanical contact with the contact part or its legs is preferably configured so that a specific final shape of the deformed legs results from the acting force causing the deformation. For example, a wall of the bending die can be formed to meet this purpose, for example circular.

The method according to the invention allows generating a particularly strong, secure and durable connection between the electrical conductor and the electrical contact part. The additional material connection avoids that the force fitting connection is weakened for example by an elastic springing back of the legs of the contact part. The method ensures that at least the legs of the contact part are materially connected to one another. The material connection is in particular established by melting the material of the legs. When the melted material is solidified again, this leads to a particularly intimate material connection of the melted regions. In this way, previously independent legs can for example be melted into a single metal part. The process of the material bonding is thus in particular a welding process. In addition, the contact part may also be materially connected with the conductor. For this, for example the power or duration of the influence that causes the material connection can be adjusted. In particular, a material connection between the legs of the contact part and the strands of a conducting cable can be established. This produces a particularly strong contact and the electrical resistance can be kept low.

The method has the advantage that thin lines can also be securely connected with the contact part. At small line cross sections of the lines, an exclusively force fitting pressing with the contact part is mostly insufficient. The additional material connection enables a qualitative improvement of the electrical contact. Likewise, thin cables with a relatively great contact part can be securely connected. As a result, use of thin lines becomes possible which overall contributes to the weight reduction of the electrical components. Connections between such contact parts and lines can also be produced in which according to the state of the art the ratio between line cross section and contact part size is unfavorable.

Preferably, a bending die is used which has at least one opening. The contact part can be manipulated through the opening so that at least the legs of the contact part are materially connected to one another. The opening forms an access to the recess of the bending die in which the pressing occurs. This allows manipulating the contact part via the opening during pressing. For example, the opening allows applying a light arc, ultrasound or electrical current to the contact part, to establish a material connection. In particular however, the opening can be used as irradiation opening for a laser beam of a welding laser. The opening creates a simple access to the recess of the bending die so that the contact part can be easily manipulated. The opening allows creating a material connection on the contact part while it is still enclosed by the bending die. The property of the bending die to produce a force fitting connection is not negatively affected in this case.

Preferably influence occurs via recesses or notches at the edges of the legs of the contact part such that a material connection between the components of the conductor in particular between the strands of the cable is produced. In addition or as an alternative influence occurs so that a material connection is also produced between the conductor and the contact part, in particular between individual strands of a cable and the legs of the contact part. For this, notches are provided on the respective end regions or outer edges of the legs, which come to lie opposite one another during the force fitting pressing. After bending the legs, individual edge regions will for example contact one another whereas on the sites with the notches openings are formed through which the region which is enclosed by the legs can be influenced. Then, a laser beam can for example be directed through these openings onto the pressed strands of a cable, which welds the pressed strands to one another and/or with the legs. The notches which extend on the border of the crimp flanks can have any desired geometry. Alternating sections can exist in which the legs directly contact one another or release a free space to the conductor. One or multiple recesses can be provided per leg.

Particularly preferably, after the crimping of the legs, the notches form openings with a surface which is smaller than the application area of the manipulation that causes the material bonding. For example, such an opening is smaller than the diameter of an acting laser beam. In this case, the manipulation occurs directly on the legs and directly on the conductor.

This embodiment allows producing a particularly intimate material connection. It is ensured that for example not only the crimp legs are welded to one another but also the strands of a cable are materially connected to one another and as the case may be, additionally with at least one of the legs of the contact element. The duration of the manipulation which causes the material bonding can also be reduced. For example a laser beam does not first have to melt the legs to a degree that its heat action also reaches the strands. In this case, for example lower laser intensities can also be used.

Preferably, the material connection is caused by introducing a laser beam. The laser beam is for example directed through the opening in the bending die onto the contact part. The opening in this case represents an entry opening for the laser beam. The laser radiation which impinges on the legs of the contact part causes at least the legs to be materially connected to one another. The source of such a laser can for example be a (welding) laser which emits particularly high-intensity laser radiation. When impinging on the legs, sufficient energy can be delivered to weld the legs to one another.

Laser welding is an established and effective method to produce a materially bonded contact. At high laser radiation, short welding times are already sufficient to establish an optimal connection in the welding material. In addition, a laser source can be positioned very flexibly and variably because the laser radiation emitted by the laser source can be guided very easily for example via mirrors, prisms, glass fiber or other optic components.

When the material connection is caused by a laser beam, it is further preferred that variables can be measured which characterize the effect of the laser beam on the contact part and/or the conductor. These variables then provide a measure for the quality of the material connection. The monitoring of the laser welding parameters enables drawing conclusions regarding the quality of the produced connection. In this case, a conventional crimp force monitoring is not required or can be supplemented by the control of the welding parameters. As already explained, the crimp monitoring often fails when lines with small cross sections and/or contact parts with great sheet thicknesses are connected to one another. A monitoring of the welding parameters allows determining whether a high quality welding connection was achieved. Elaborate additional technical measures to ensure the quality of the crimp connection are no longer required. The quality of the achieved connection is sufficiently ensured by the measuring, analyzing and monitoring of laser welding parameters.

Preferably, the measured variable is a welding time. As an alternative or in addition, an intensity of the introduced laser beam (22) can be measured. As an alternative or in addition, the wave length of the radiation with the highest radiation intensity emitted by the region (30) on which the laser acts can be measured. In the latter case, the temperature can be determined for example according to wiensch's shifting law, which in turn improves the quality control of the welding process.

It is further preferred that the material connecting occurs after a predetermined target deformation of the legs was achieved via the bending die. In order to achieve a sufficient force fitting pressing, it is necessary that the legs are appropriately deformed by the bending die. Such a bending can then be defined as target deformation. In particular, the target deformation corresponds to the maximal deformation, which is achieved in the respective crimping process. The target deformation can also be the bending of opposing legs so that they overlap one another and/or contact one another.

In this embodiment it is ensured that on one hand the positive connection between the contact part and the conductor is optimal and on the other hand the best possible conditions for an effective material connection are established. If for example the legs contact one another, only little material may have to be melted to achieve a material connection. A distinctive target deformation also achieves that the leg material only retains small elastic properties. An impairment of the quality of the crimp connection by springing back of the legs is avoided in this case. The step of the material connecting does not increases the cycle time for the actual crimp process or only to a minor degree. The method is thus approximately cycle time neutral.

The dimensions of the contact part can be characterized by its longitudinal and transverse extent. It is preferred that the material connecting occurs in a portion which is centered with regard to the longitudinal extent. In particular, the central region is a region which is arranged centered with regard to the longitudinal extension of the contact part.

Typically, in such a middle region the strands of a cable lie particularly close to each other between the legs. Therefore the deformation forces will be particularly high there and the legs will preferably elastically move back. An additional material connection then inhibits the backward springing of the legs at this site particularly effectively. Front and rear end regions of the deformed contact part region are often funnel shaped so that a material connection in this region has little effect.

The invention further relates to a device for connecting an electrical conductor with an electrical contact part. The device according to the invention includes a laser welding device and a bending die. The bending die is configured to deform the legs of the electrical contact so that they force fittingly press the conductor together with the contact part. The laser welding device is configured to act on the contact part so that at least the legs are materially connected to one another. This occurs in particular by means of a welding laser beam, which is emitted by the laser welding device.

Preferably, the bending die has also a bending side, on which the legs of a contact part can interact with the bending die. On the bending side, the occurring pressures between the bending die and the contact part can typically be maximal. The bending side typically has a characteristic surface shape or topography in order to deform the legs of a contact part under the action of force in a targeted manner. It is further preferred that the bending die has an opening which is a through opening for a welding laser beam which is emitted by a laser welding device. Through this opening, the welding laser beam can be introduced into a recess which is delimited by the bending side. Preferably, the opening is located in the bending side itself. In this case, the bending side not only enables the targeted deformation of the legs of the contact part but also the introduction of the laser beam which welds the legs together.

Further, the device preferably also has a measuring device which is configured to measure variables which characterize the welding laser beam. Via such a measuring device the quality of the welding process and the material connection associated therewith is ensured.

In a further preferred embodiment, the device includes a positioning device which is capable to appropriately position the laser welding device and/or the contact part. In particular, the arrangement of the laser welding device and contact part relative to one another can be controlled. When the legs of the contact part have recesses along their edges the position of the contact part can be adjusted via the positioning device so that at least one recess comes to lie in the welding laser beam. The positioning device thus allows quasi targeting the recesses with the laser beam. After the pressing of the crimp legs, through-openings to the conductor are released via the recesses. Then, the laser can directly act on the conductor, and the strands of the conductor can be welded to one another.

The preferred embodiments presented with regard to the method according to the invention, and their advantages correspondingly apply for the device according to the invention.

BRIEF DESCRIPTION OF THE DRAWING

Further features of the invention result from the claims, the figures and the description of the figures. The features and feature combinations mentioned previously in the description and the features and feature combinations mentioned in the figures and/or the features and feature combinations shown by themselves in the figures are not only usable in the respective combination set forth but also in other combinations or by themselves without departing from the framework of the invention.

In the following, the invention is explained in more detail by way of exemplary embodiments. It is shown in FIG. 1A-1D schematic representations of a device for connecting an electrical conductor with an electrical contact part at four different time points during the course of the connecting method according to the invention.

In the figures, same elements or elements having the same function are provided with the same reference signs.

DETAILED DESCRIPTION OF PREFERRED EMBODIMENTS

Figure 2:
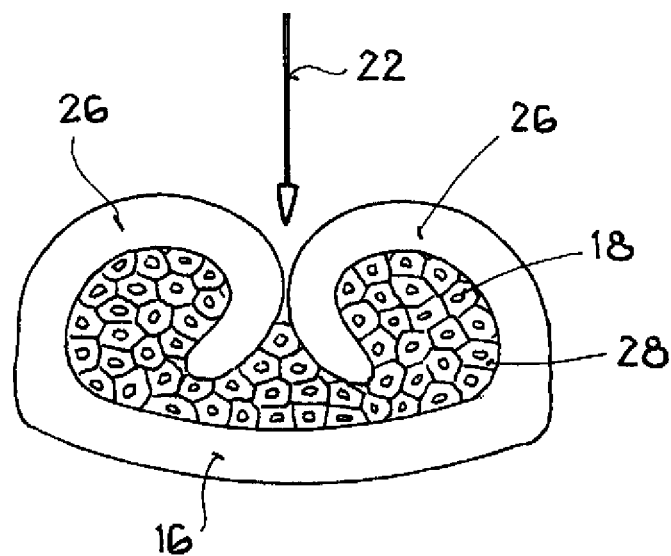
FIG. 2 a schematic sectional representation through an electrical contact part with deformed legs and force fittingly pressed strands of a cable.

FIGS. 1A-1D show a device 10 for connecting an electrical contact part 16 with an electrical conductor 18 in four different positions (1)-(4) which are characteristic for the connection method. The device 10 includes in particular a plunger 24 on which the contact part 16 rests. In the exemplary embodiment, the contact part 16 is made of metal and has legs 26 pair wise opposing one another. The conductor 18 is loosely inserted between the legs 26. In the exemplary embodiment, the conductor 18 is a cable with multiple individual conductors or strands 28. In particular at the time point (21) (FIG. 1A) no permanent connection between the contact part 16 and the strands 28 of the conductor 18 is established yet. In the exemplary embodiment, the Strands 28 are made of an electrically conducting material. The device 10 also includes a bending die 12 which is configured as counterpart to the plunger 24. This allows inserting at least a sub region of the plunger 24 into a recess 32 of the bending die 12. Plunger 24 and bending die 12 form fittingly interact with one another as part and counter part. The recess 32 is configured as oblong slot whose bottom side 34 has an opening 14. The bending die 12 is also referred to as crimper and is made of metal. The crimper is a wear part which usually has to be replaced after frequent repetition of the connection method according to the invention. The bending die 12 is thus a replaceable crimp tool of the device 10.

The device 10 further includes a laser 20, capable of emitting a laser beam 22. The laser 20 serves as welding laser whose high intensity laser radiation is suited for melting metal. The laser 20 is arranged so that the laser beam 22 emitted by the laser is introduced through the opening 14 of the bending die 12 into the recess 32. The special arrangement of the laser 20 relative to the bending die 12 is to be understood as highly schematized. The laser 20 can be arranged in any desired manner relative to the bending die 12 so long as its laser beam 22 can be appropriately introduced through the opening 14 of the bending die 12. This can be achieved in particular also via not shown beam deflecting elements. Other possibilities of introducing the laser beam 22 are conceivable. Thus, the laser beam 22 can be introduced through the opening 14 into the recess 32 by means of a light conductor for example an optic fiber. The light conductor then extends for example through a sub region of the opening 14 or through the entire opening 14 up to a wall region of the recess 32 or even as far as into the recess 32. The bending die 12 can also have multiple openings, wherein each opening can be assigned a separate laser beam 22. It can also be provided that the laser beam 22 is successively introduced through different openings. The laser beam 22 can also be introduced through openings selected from a multitude of openings. In particular, a single laser beam 22 can also be split via multiple light conductors, wherein the individual light conductors in this case extend into the recess 32 via the multiple openings.

The device 10 is also referred to as applicator. However, as an alternative it can also be provided that the applicator is spatially separated from the laser 20 in which case the applicator then includes the core components bending die 12 and plunger 24. In particular a thus configured applicator and the separate laser 20 can then form two individual devices whose combination then leads to the device 10.

In order to connect the contact part 16 with the conductor 18, the plunger 24 and the bending die 12 move toward one another so that the plunger 24 advances form fittingly into the recess 32. The plunger 24 supports the contact part, which rests on the plunger 24, with the conductor 18. The bending die 12 is then moved perpendicularly toward the plunger 24 (see time point (2) in FIG. 1B).

At a time point (3) (FIG. 1C) the plunger 24 has advanced into the recess 32 to a degree that the legs 26 of the contact part 16 contact the bottom side 34 of the bending die 12. The legs 26 then form a counter force acting against a further approach of plunger 24 and bending die 12.

A continued application of force on the plunger 24 or the bending die 12 results in deformation of the legs 26. Depending on the duration of the force application and the degree of deformation, the resulting deformation of the legs is plastic in nature. An appropriate shape of the side 34 achieves that the legs are deformed in a controlled and predefined manner. In the exemplary embodiment, the side 34 has two circular-section-shaped roundings, which the legs 26 follow during the deformation so that they quasi curl in.

FIG. 2 shows a contact part 16 with deformed legs 26. The legs 26 which are formed on opposite sides of the contact part 16 are spirally bent in due to the defined action of force and abut one another in the middle. The strands 28 which were previously lying loose in the contact part 16 28 of the conductor 18 are force fittingly pressed together with the contact part 16. In a certain sense, this is thus a press contact which was generated by targeted squeezing of the legs 26. Due to the fact that the strands 28 intimately rest against one another and against the contact 6, a good electrical contact between all elements pressed together in this manner is created.

The purely force fitting pressing is also referred to as crimping or flanging. The legs 26 can partially elastically spring back in the direction of their starting position so that the force fitting connection with the Strands 28 is loosened. This can also result in an impairment or even interruption of an electrical contact which may be established between the conductor 18 and the contact part 16.

Therefore, a further step is provided in which an additional material connection at least between the legs among one another is established (see time point (4) in FIG. 1D). As soon as the plunger 24 has advanced the deepest into the recess 32 of the bending die 12, a laser beam 22 is applied through the opening 14 onto the deformed legs 26. This time point is also referred to as lower dead point. At this point the legs 26 are maximally deformed and closed around the strands 24 as optimally as possible. Because in the lower dead point, force is still exerted on the contact part 16, the legs 26 can not elastically spring back yet. The laser beam 22 impinges on the legs 26, heats the legs 26 up and melts them. This causes the legs 26 to be welded together and materially connected. In the exemplary embodiment, the intensity and duration of application of the laser irradiation is selected so that not only the legs 26 are welded to one another but also the contact part 16 with the strands 28 and some of the strands 28 to one another. This creates a particularly intimate, durable, strong and secure mechanical connection. The good material connection then also leads to an optimal electrical connection i.e., a connection with low electrical resistances.

The process of crimping i.e., the bending of the legs 26 occurs over a defined period of time: an already crimped contact part 16 is removed from the device 10 and elements to be connected anew are inserted. The duration for one cycle of the crimping process is also influenced by the time period which is needed to press the conductor 18 and the contact part 16 together. The process of the laser welding does not or only insignificantly, increase the cycle time of the crimp process. The combined crimping-/welding method is thus cycle time neutral compared to the pure crimping method. Because for example 100 to 1000 crimp connections can be produced per minute this is a significant advantage. Although the crimp connection is improved by the additional welding, the time required for the entire process is not or only insignificantly increased.

The quality control of the combined crimp- and welding method occurs in the exemplary embodiment by the monitoring of the laser welding parameters according to the state of the art. The quality of the force fittingly produced crimp connection is usually ensured in that the forces occurring during the deforming are monitored. In the here shown exemplary embodiment such a crimp force monitoring is supplemented by the additional monitoring of the laser welding parameters. This additional quality-ensuring step guarantees that a sufficient connection between the contact part 16 and the conductor 18 is created. Under certain circumstances (for example unfavorable size ratios of conductor 18 and contact part 16), this may not be accomplished by an exclusive crimp force monitoring.

The contact part 16 has a defined longitudinal extent and a defined transverse extent. FIG. 2 only shows the transverse extent in left-right extension. The legs 26 which are arranged so as to pair wise oppose one another are deformed symmetrical to one another and contact one another in a region which is centered relative to the transverse extent. As schematically indicated by the introduction position and direction of the laser beam 22 in FIG. 2, the material connection of the legs 26 occurs in exactly this contact region. In this case, a particularly good connection is ensured and an elastic springing back of the legs 26 can be prevented as much as possible.

Figure 3:
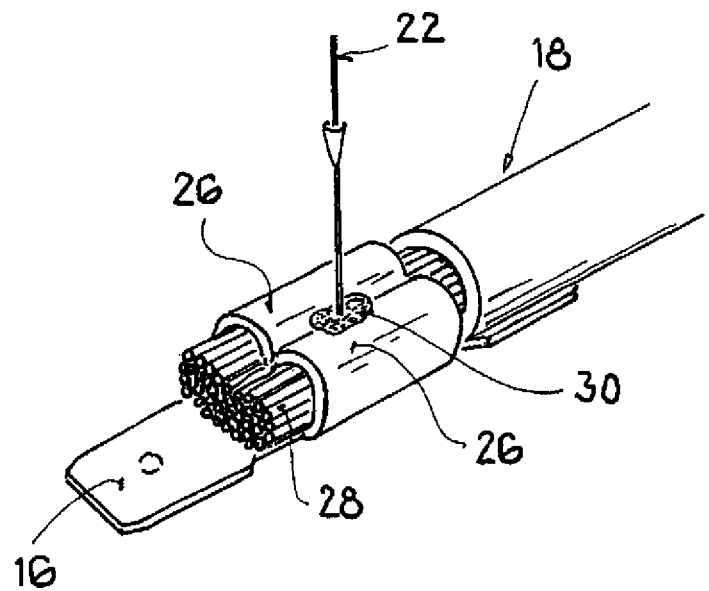
FIG. 3 a perspective representation of a contact part whose legs are force fittingly pressed together with the strands of a cable, at a time point of the laser welding.
Figure 4A:
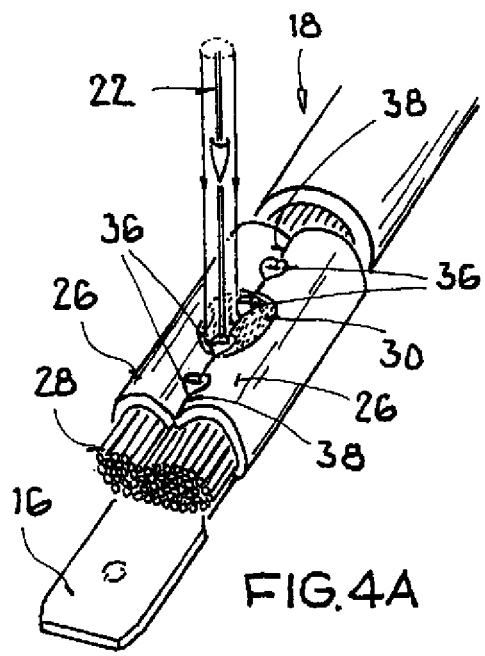
FIG. 4A a perspective representation of a contact part whose legs are force fittingly pressed together with the strands of a cable, wherein the legs have multiple recesses as through openings for a laser beam.
Figure 4B:
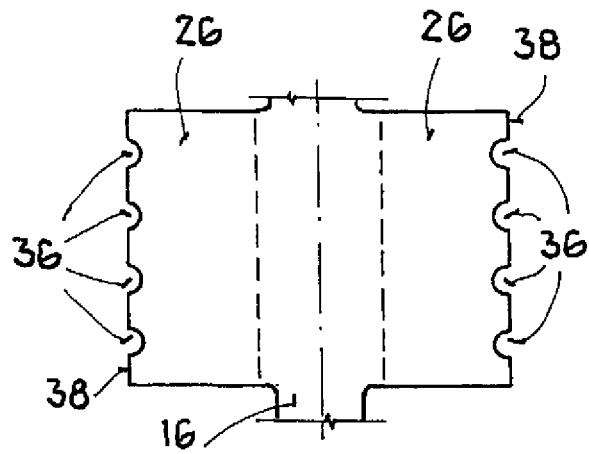
FIG. 4B a schematic plan view onto a section of the contact part of FIG. 4A, wherein the legs are shown in the unfolded state.
Figure 5A:
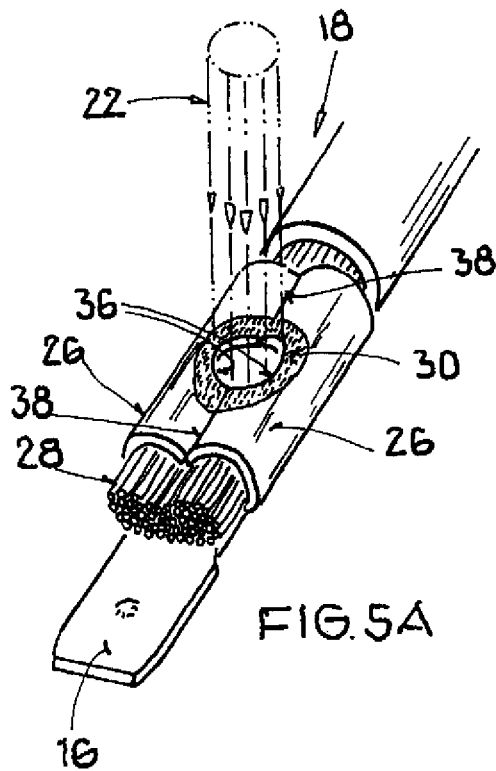
FIG. 5A a perspective representing of a contact part whose legs are force fittingly pressed together with the strands of a cable wherein the legs each have a recess which together form a through opening for a laser beam.
Figure 5B:
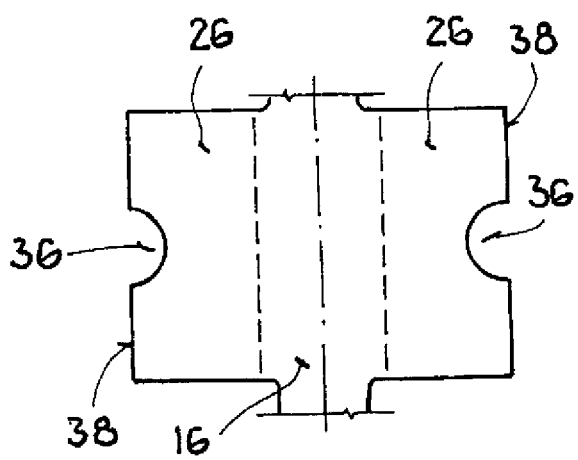
FIG. 5B a schematic plan view onto a section of the contact part of FIG. 5A, wherein the legs are shown in the unfolded state.

In the exemplary embodiment of FIG. 3, the welding region 30 is not only arranged centered relative to the transverse extent of the contact part 16, but also centered relative to its longitudinal extent. This allows achieving a very controlled and stable material connection.

In the exemplary embodiments of FIGS. 4A to 5B, specially configured contact parts 16 are shown which allow for a simple and at the same time very effective control of the type of material connection. The edges 38 of the opposing legs 26 of the contact part 16 are specially shaped. This can in particular be seen in the representations of FIGS. 4B and 5B in which the section of the contact part 16 which encloses the legs 26 is shown with outward folded or un-crimped legs 26 in plan view. The legs 26 each have one (FIG. 5B) or multiple (FIG. 4B) notches 36 which are formed along the otherwise straight edges 38 of the legs 26. During the force fitting pressing, the notches 36 of the respective opposing legs 26 come to lie next to one another and form openings, through which a laser beam 22 can be directly applied onto the strands which lie between the legs 26. According to FIG. 5A, the laser beam 22 can be radiated onto the Strands in a targeted manner though the opening which is formed by the notches 36 and materially connect the strands to one another. This occurs in addition to the material connection of the legs 26 because the opening has a surface which is smaller than the cross sectional surface of the laser beam 22. According to FIG. 4A, multiple notches 36 can also be formed so that in a region 30 the legs 26 are welded and on the other hand the laser beam 22 reaches the strands 28 via the notches 36, in order to materially connect the strands to one another. The notches 36 in the exemplary embodiment are circular-section shaped.

The invention claimed is:

1. A device for connecting an electrical conductor to an electrical contact part, comprising:
 a bending die having a recess, said recess having a bending side arranged opposite a topside of the bending die, said bending side having adjacent arches curved toward the topside, said bending die having an opening extending between the topside and the bending side;
 a plunger having a support surface supporting the electrical contact part, said plunger being receivable in the recess so as to engage legs of the electrical contact part with the bending side of the bending die, wherein engagement of the bending side with the legs of the contact part effects a bending of the legs toward a center of the contact part, thereby causing legs to force fitting engagement of the legs with a conductor situated between the legs; and
 a laser welding device arranged relative to the bending die so that a laser beam emitted by the laser welding device is directable through the opening into the recess and onto the contact part so as to effect material connection of at least the legs of the contact part.

2. The device of claim 1, wherein the opening is arranged in the bending side.

3. The device of claim 1, further comprising a positioning device, configured to position the laser welding device and/or the contact part so that the welding laser beam emitted by the laser welding device impinges at a site of at least one recess respectively provided on a respective edge of each of the legs.

* * * * *